(No Model.)
W. H. ADAMS.
CAR BRAKE.
No. 271,206. Patented Jan. 30, 1883.
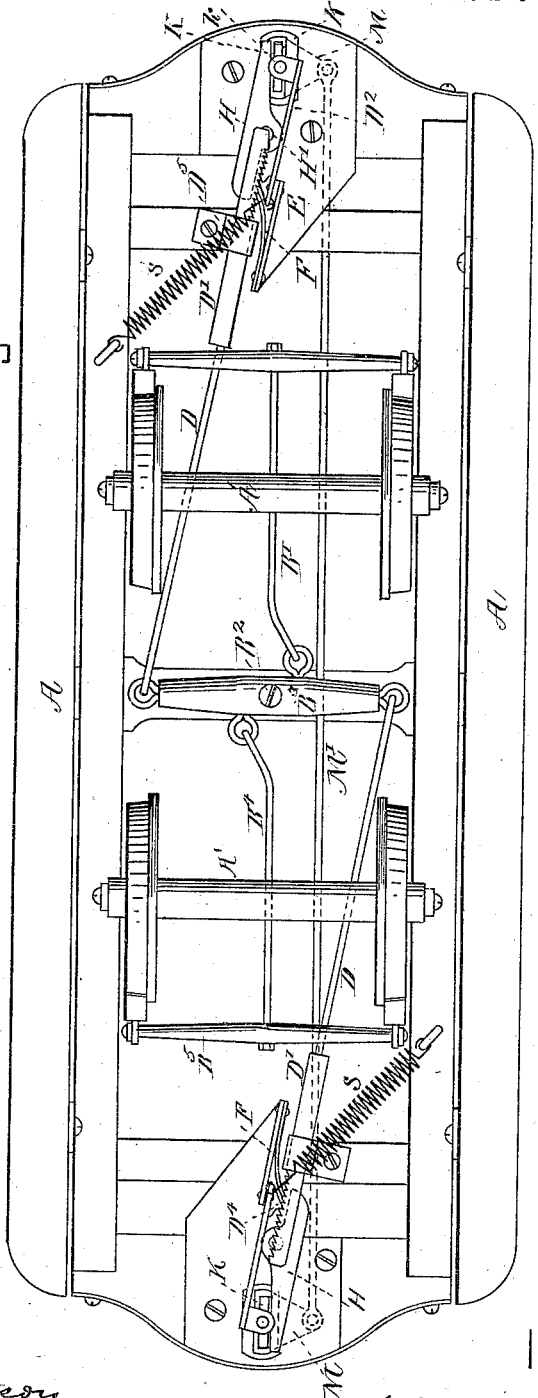
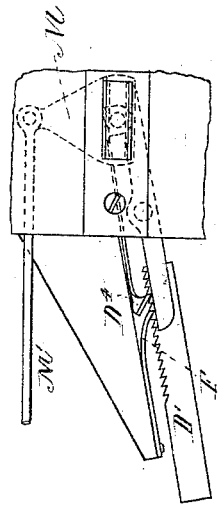
Fig. 3.
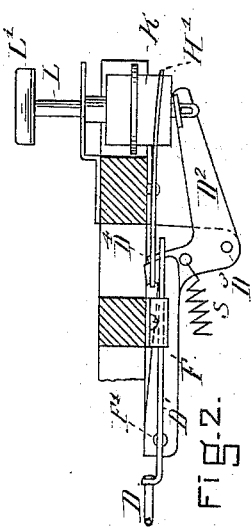
Fig. 2.
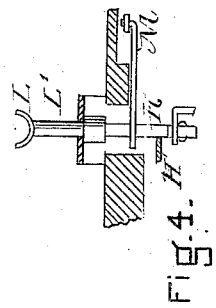
Fig. 1.
Fig. 4.
WITNESSES
William Edson
Helen M. Finegan
INVENTOR
William H. Adams
N. PETERS, Photo-Lithographer, Washington, D. C.

UNITED STATES PATENT OFFICE.

WILLIAM H. ADAMS, OF BOSTON, MASSACHUSETTS.

CAR-BRAKE.

SPECIFICATION forming part of Letters Patent No. 271,206, dated January 30, 1883.

Application filed October 9, 1882. (No model.)

*To all whom it may concern:*

Be it known that I, WILLIAM H. ADAMS, of Boston, in the county of Suffolk, in the State of Massachusetts, have invented certain new and useful Improvements in Horse-Car Brakes, of which the following is a specification.

My invention relates to that class of brakes in which the user operates the same by the pressure of his foot. The object being to provide a device by which the operator by repeated pressure of his foot may accumulate the force to be applied to the brake to any desired extent, and by a simple turn of the foot annul the force so applied and release the wheels from the pressure of the brake. This object I attain by mechanism shown in the accompanying drawings, in which—

Figure 1 is a plan view of the under side of the car. Fig. 2 is an elevation of the device for operating the brake. Fig. 3 is a plan of the parts shown in Fig. 2. Fig. 4 is a vertical section, showing the foot-rest and some of its connected parts.

In the drawings, A represents the body of the car, provided with trucks A' A', and with the ordinary Tanner brake device, B B' B² B³ B⁴ B⁵. The above parts, not being new and being well known, do not require further description.

I will now describe my invention.

D' is a ratchet-plate connected to the brake-rod D. (See Figs. 1 and 2.) This ratchet-plate slides in a housing, D⁵.

D² is a bell-crank lever, the end D⁴ of which acts as a pawl to engage with the ratchet D', so that each movement of this bell-crank lever D² will cause the ratchet-plate D' to advance, which action, acting through the rod D and central lever, D³, brings the brakes to bear upon the wheels.

F is a retaining-pawl, which holds the plate D' and its connecting parts in the position in which the actuating-pawl D⁴ leaves them.

The bent lever D² is operated by the foot socket or rest L and the vertical rod L'. The return motion of the foot-rest L is caused by the tension-spring S, which, acting through the bell-crank lever D², throws it up. The spring S also in drawing back the pawl end of the bell-crank lever places it in position to re-engage with the ratchet D'.

To release the ratchet D' and through it the whole brake device, I attach to the lower end of the rod L' a tumbler, K. This tumbler, acting upon the lever H, which is pivoted at H', causes (when turned by the motion of the foot in the foot-rest L) the rear end of the lever H to force the acting-pawl D⁴ and the holding-pawl F out of connection with the ratchet-teeth of the plate D', thus releasing the plate D' and the entire brake device.

The foot-rests L L at the ends of the car are connected together by arms M M and the rod M', so that the turning of one foot-rest will operate the other, and through it all of the connecting parts.

I claim—

1. The combination of the foot-rest L, rod L', and bell-crank pawl-lever D², with the ratchet-plate D', rod D, and brake device, substantially as described, and for the purpose set forth.

2. The combination of the foot-rest L, rod L', and the tumbler K, with the lever H and pawls D⁴ F, whereby the ratchet D' is released, all operating together, substantially as described, and for the purpose set forth.

WILLIAM H. ADAMS.

Witnesses:
WILLIAM EDSON,
HELEN M. FEEGAN.